(12) United States Patent
Alimi

(10) Patent No.: US 11,894,664 B2
(45) Date of Patent: Feb. 6, 2024

(54) POWER DRIVER DEVICE FOR FISH TAPE

(71) Applicant: UNIVERSAL LINK LTD, Ein Vered (IL)

(72) Inventor: Ahmed Alimi, Kfar Qara (IL)

(*) Notice: Subject to any disclaimer, the term of this patent is extended or adjusted under 35 U.S.C. 154(b) by 44 days.

(21) Appl. No.: 17/618,470

(22) PCT Filed: Jun. 17, 2020

(86) PCT No.: PCT/IL2020/050672
§ 371 (c)(1),
(2) Date: Dec. 12, 2021

(87) PCT Pub. No.: WO2020/261259
PCT Pub. Date: Dec. 30, 2020

(65) Prior Publication Data
US 2022/0302687 A1    Sep. 22, 2022

Related U.S. Application Data

(60) Provisional application No. 62/865,227, filed on Jun. 23, 2019.

(51) Int. Cl.
*H02G 1/08*  (2006.01)
*B65H 75/30*  (2006.01)

(52) U.S. Cl.
CPC ............ *H02G 1/083* (2013.01); *B65H 75/305* (2013.01); *H02G 1/08* (2013.01)

(58) Field of Classification Search
CPC .......... H02G 1/083; H02G 1/08; H02G 1/086; H02G 1/085; H02G 1/06
See application file for complete search history.

(56) References Cited

U.S. PATENT DOCUMENTS

| | | | | |
|---|---|---|---|---|
| 4,117,873 A * | 10/1978 | Crawford | ................. | H02G 1/00 254/134.3 R |
| 5,692,662 A * | 12/1997 | Fladl | ...................... | H02G 1/085 226/177 |
| 5,816,466 A * | 10/1998 | Seufer | .................. | B23K 9/1333 242/615.3 |
| 6,557,742 B1 * | 5/2003 | Bobeczko | ............ | B23K 9/1336 226/193 |
| 8,695,944 B2 * | 4/2014 | Riggins | .................. | H02G 1/081 254/342 |
| 10,294,067 B1 * | 5/2019 | DeBellis | ............... | B65H 75/305 |
| 2002/0066893 A1 | 6/2002 | Quinn | | |
| 2012/0168699 A1 | 7/2012 | Rachminov et al. | | |
| 2013/0026429 A1 * | 1/2013 | Jordan | ................... | B65H 51/10 254/389 |

* cited by examiner

*Primary Examiner* — Seahee Hong

(57) ABSTRACT

A method and device are disclosed for driving a fish tape. In some embodiments, a portion of the fish tape is loaded into a driver device. Optionally, an actuator connected to the driver device moves the tape longitudinally with respect to the driver device. For example, a distal portion of the tape and/or a distal tip thereof is driven out from and/or into an exit opening of the driver device. Optionally by retaining exit opening of the driver device near an opening of a conduit, the driver drives the distal tip of the tape into or out of the conduit. In some embodiment the tape is driven by a friction wheel. In some embodiment, power is supplied by a power tool (e.g. a power screwdriver) that is reversibly attached to the driver.

23 Claims, 14 Drawing Sheets

POWER DRIVER DEVICE FOR FISH TAPE

FIELD AND BACKGROUND OF THE INVENTION

The present invention, in some embodiments thereof, relates to a power driver device for a fish tape (sometimes referred to as a draw wire, wire snake and/or wire tape).

SUMMARY OF THE INVENTION

According to an aspect of some embodiments of the invention, there is provided a method of inserting a fish tape into a conduit including: loading a fish tape into a driver device; retaining an exit opening of the driver device proximal to an opening of the conduit; activating the driver device to drive a portion of the fish tape through the driver device, out the exit opening of the driver device and into the conduit.

According to some embodiments of the invention, the loading the fish tape into the driver device includes inserting the fish tape between a friction wheel and a retainer.

According to some embodiments of the invention, the inserting includes feeding a distal end of the fish tape longitudinally between the friction wheel and the retainer.

According to some embodiments of the invention, the inserting is through a proximal opening of the driver device.

According to some embodiments of the invention, the inserting includes sliding the fish tape laterally into a space between the friction wheel and the retainer.

According to some embodiments of the invention, the method where the inserting includes opening a cover of the driver device, positioning the fish tape and replacing the cover.

According to some embodiments of the invention, the method further includes loosening the retainer before the positioning the fish tape and tightening the retainer after the positioning.

According to some embodiments of the invention, the activating includes actuating an electric actuator.

According to some embodiments of the invention, the method further includes reversibly attaching the actuator to the driver device.

According to an aspect of some embodiments of the invention, there is provided a method of drawing a fish tape out of a conduit including: supplying a fish tape having a distal portion inserted into a conduit and a proximal portion extending out of an opening of the conduit; retaining an exit opening of a driver device proximal to the opening of the conduit; activating the driver device for pulling the distal portion of the fish tape through the opening of the conduit into the exit opening of the driver device.

According to some embodiments of the invention, the pulling the fish tape into the driver device includes driving the fish tape between a friction wheel and a retainer.

According to some embodiments of the invention, the method further includes driving the distal portion out of an entrance opening of the driver device.

According to some embodiments of the invention, the activating includes actuating an electric actuator.

According to some embodiments of the invention, the method further includes reversibly attaching an actuator to the driver device and wherein the activating the driver device include activating the actuator.

According to an aspect of some embodiments of the invention, there is provided a driver device for a fish tape including: a tape interface configured for transforming kinetic energy into longitudinal movement of the fish tape with respect to the driver device; a transmission configured for transmitting kinetic energy from an actuator to the tape interface.

According to some embodiments of the invention, the driver device further includes: a guide configured for directing the longitudinal movement of the fish tape into movement into or out of a conduit.

According to some embodiments of the invention, the guide includes an exit opening of the driver device.

According to some embodiments of the invention, the tape interface includes a friction wheel.

According to some embodiments of the invention, the friction wheel is sandwiched between two cogs.

According to some embodiments of the invention, a radius of the friction wheel less than a radius of each of the two cogs.

According to some embodiments of the invention, where the friction wheel includes a covering of at least one material includes natural rubber, vulcanized rubber, plastic and silicone.

According to some embodiments of the invention, the driver device further includes a retainer configured to hold the fish tape against the friction wheel.

According to some embodiments of the invention, the driver device further includes a tension element comprised to apply a compressing force on the fish tape between the retain and the friction wheel.

According to some embodiments of the invention, the tension element includes an elastic element.

According to some embodiments of the invention, the driver device further includes an adjuster configured to adjust a distance between the retainer and the friction wheel.

According to some embodiments of the invention, the adjuster includes a screw thread connecting between the retainer and the friction wheel and wherein twisting the screw thread in a first direction moves the retainer towards the friction wheel and wherein twisting the screw thread in an opposite direction distances the retainer from the friction wheel.

According to some embodiments of the invention, the transmission includes a standard fitting configured for reversible attachment to the actuator.

According to some embodiments of the invention, the driver device wherein the fitting is concentric to an axle of a drive cog.

According to some embodiments of the invention, the drive cog includes a pair of cogs.

According to some embodiments of the invention, the pair of cogs are positioned on opposite sides of a movement path of the fish tape.

According to some embodiments of the invention, the standard fitting is configured for attachment to a power screwdriver.

According to some embodiments of the invention, the standard fitting includes at least one of a graspable head, a socket and a shank.

According to some embodiments of the invention, the standard fitting includes at least one of a hex head, a rectangular head, a hex socket, a rectangular socket, round shank, a hexagonal shank and a rectangular shank.

Unless otherwise defined, all technical and/or scientific terms used herein have the same meaning as commonly understood by one of ordinary skill in the art to which the invention pertains. Although methods and materials similar or equivalent to those described herein can be used in the practice or testing of embodiments of the invention, exemplary methods and/or materials are described below. In case of conflict, the patent specification, including definitions, will control. In addition, the materials, methods, and examples are illustrative only and are not intended to be necessarily limiting.

BRIEF DESCRIPTION OF THE SEVERAL VIEWS OF THE DRAWING(S)

Some embodiments of the invention are herein described, by way of example only, with reference to the accompanying drawings. With specific reference now to the drawings in detail, it is stressed that the particulars shown are by way of example and for purposes of illustrative discussion of embodiments of the invention. In this regard, the description taken with the drawings makes apparent to those skilled in the art how embodiments of the invention may be practiced.

DESCRIPTION OF SPECIFIC EMBODIMENTS OF THE INVENTION

Figure 1:
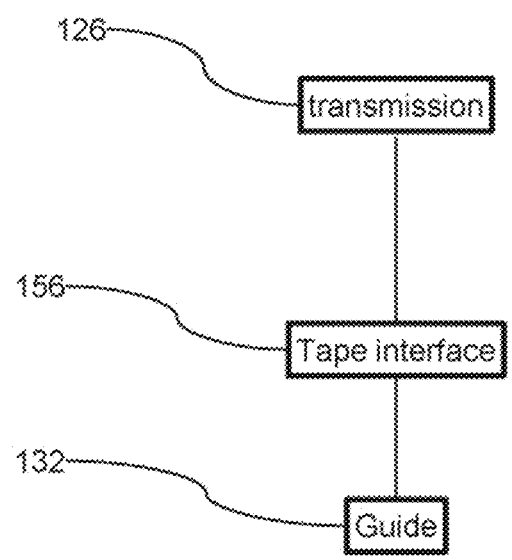
FIG. 1 is a block diagram of a fish tape driver device in accordance with an embodiment of the current invention.

The present invention, in some embodiments thereof, relates to a power driver device for a fish tape (sometimes referred to as a draw wire, wire snake and/or wire tape).
Overview Wiring in buildings is often positioned by pulling cables, telephone, communications, etc. through path in an internal spaces for example a conduit with a guide string. Often in order to position the guide string, a fish tape (sometimes called a cable snake and/or steel band) is inserted into and/or through the path. In some cases, the fish tape may be used to pull the cable through the conduit. For example, a distal tip of the fish tape may be pushed through the conduit. After the tip of the fish tape reaches the far end of the conduit, it is optionally connected to the electrical wires and/or telephone wires and/or communication cable and/or a guide string which are then and pulled back through the conduit using the fish tape until the string and/or wires reach their destination (e.g. the opening at the near end of the conduit). The operation, e.g. pushing the fish tape into the conduit and/or pulling the fish tape back through the conduit action together with the wires, cables and/or string is sometimes a manual operation that requires may require great effort, may take a long time and/or causes discomfort or even injury to e.g. to the hands and/or arms and/or wrists of the user.

An aspect of some embodiments of the current invention relates to a method of pushing and/or pulling a fish tape by a powered driver device. Optionally, a conventional fish tape is driven by a driving device. For example, the fish tape may be fed through a proximal opening into the device and/or a tip of the fish tape may be driven from a distal opening of the device. Optionally the distal opening of the device is retained near a near opening of a conduit and/or a distal portion of the tape including the tip of the fish tape is driven from the distal opening into the conduit and/or drawn into the distal opening out of the conduit by the driver device. For example, an exit opening of the driver device may be held within 3 cm of the opening of the conduit and/or within 10 cm thereof and/or within 1 meter thereof. Optionally the exit opening of the driver device is directed towards the opening of the conduit and/or nearly parallel to the conduit at the opening (e.g. within 5 degrees to parallel and/or within 10 degrees and/or within 30 degrees and/or within 60 degrees).

An aspect of some embodiments of the current invention relates to a device for pushing and/or pulling a fish tape. Optionally the device includes a set of friction wheels driven by an actuator. Optionally, the fish tape is retained by compression between the friction wheels and a retainer. For example, an elastic member may compress fish tape between the friction wheels and the retainer. In some embodiments, an elastic forcing member (for example a spring) maintains a compression force between the wheels and/or the fish tape and/or the retainer. Optionally, an adjusting element can be used to adjust the relative position of the wheels and/or the retainer. Optionally, the distance between the wheels and the retainer may be adjusted, for example, to accommodate thicker and/or thinner tapes.

In some embodiments, the fish tape may pass through the apparatus through a proximal entrance opening to a distal exit opening. Inside the device, the fish tape may pass across and/or between friction wheels. For example, an actuator driving the friction wheels may include an AC motor and/or a DC motor and/or a brushless motor and/or another mechanism. For example, an electric screwdriver and/or drill may be reversibly attached to a transmission and/or guide of the current invention to drive the fish tape. Alternatively or additionally, the drive mechanism may include a dedicated actuator (e.g. motor). Optionally reversing the direction of the actuator will reverse the direction of movement of the fish tape.

Exemplary Embodiments

Before explaining at least one embodiment of the invention in detail, it is to be understood that the invention is not necessarily limited in its application to the details of construction and the arrangement of the components and/or methods set forth in the following description and/or illustrated in the drawings and/or the Examples. The invention is capable of other embodiments or of being practiced or carried out in various ways.

FIG. 1 is a block diagram of a fish tape driver device in accordance with an embodiment of the current invention. In some embodiments, a fish tape driver device may include a tape interface 156. For example, the tape interface connects to the tape and/or drives the tape forward or pulls it backward. For example, the tape interface 156 may include a friction roller and/or a toothed roller. Optionally the tape interface 156 drives the tape through a guide 132. The guide 132 may be attached to the tape interface 156. For example, the guide 132 may include a channel passing through the device and/or an entrance and/or exit slot in the device. For example, the guide 132 may include a track and/or a flanged wheel. Optionally, a transmission 126 is attached to the tape interface and/or is configured to transfer power (e.g. kinetic energy) from an actuator to the tape interface 156, Optionally, the transmission is immovably attached to the guide 132 and/or movably attached to the guide 132. Optionally, the transmission is immovably attached to the tape interface 156 and/or movably attached to the tape interface 156. For example, a standard fitting may be supplied for attaching the transmission to a power tool (for example a drill and/or power screwdriver and/or a power wrench). Optionally, attachment between the actuator and the device may be reversible and/or irreversible and/or permanent.

In some embodiments a transmission 126 transmits kinetic energy of an actuator to the tape interface 156. Optionally the interface 156 converts the kinetic energy into a longitudinal movement of the tape with respect to the driver device. For example, the transmission 126 may transmit rotation of an actuator to a wheel which may rotate. Rotation of the wheel optionally pushes and/or pulls the tape longitudinally with respect to the driver device. For example, a distal portion of the tape may be driven into and/or out of an opening in the driver device.

In some embodiments a fish tape driver device drives an off the shelf and/or standard fish tape. For example, a fish tape may be stored coiled and/or on a reel. In some embodiments, the fish tape has a natural curvature. Optionally, this curvature may facilitate guiding the tape through a conduit. For example, the tape can be directed along a curve by rotating the tape (and or the driver device pushing the tape). In some embodiments, tape is rigid enough that it can then be pushed in the direction in which it is pointing. In this way the tape may be guided, for example, through an empty wall cavity through and/or around thermal insulation, firestops, pipes, HVAC ducts, electrical conduits, and other obstructions. The tape may be made from many different materials including for example steel, fiberglass, and nylon. Optionally, the tape has a special tip (e.g. a hook or loop and/or a fastener device). The tip may be configured to facilitate the user attaching the tape to the guide string (or cable) for example in order to pull it back though the conduit.

Figure 2:
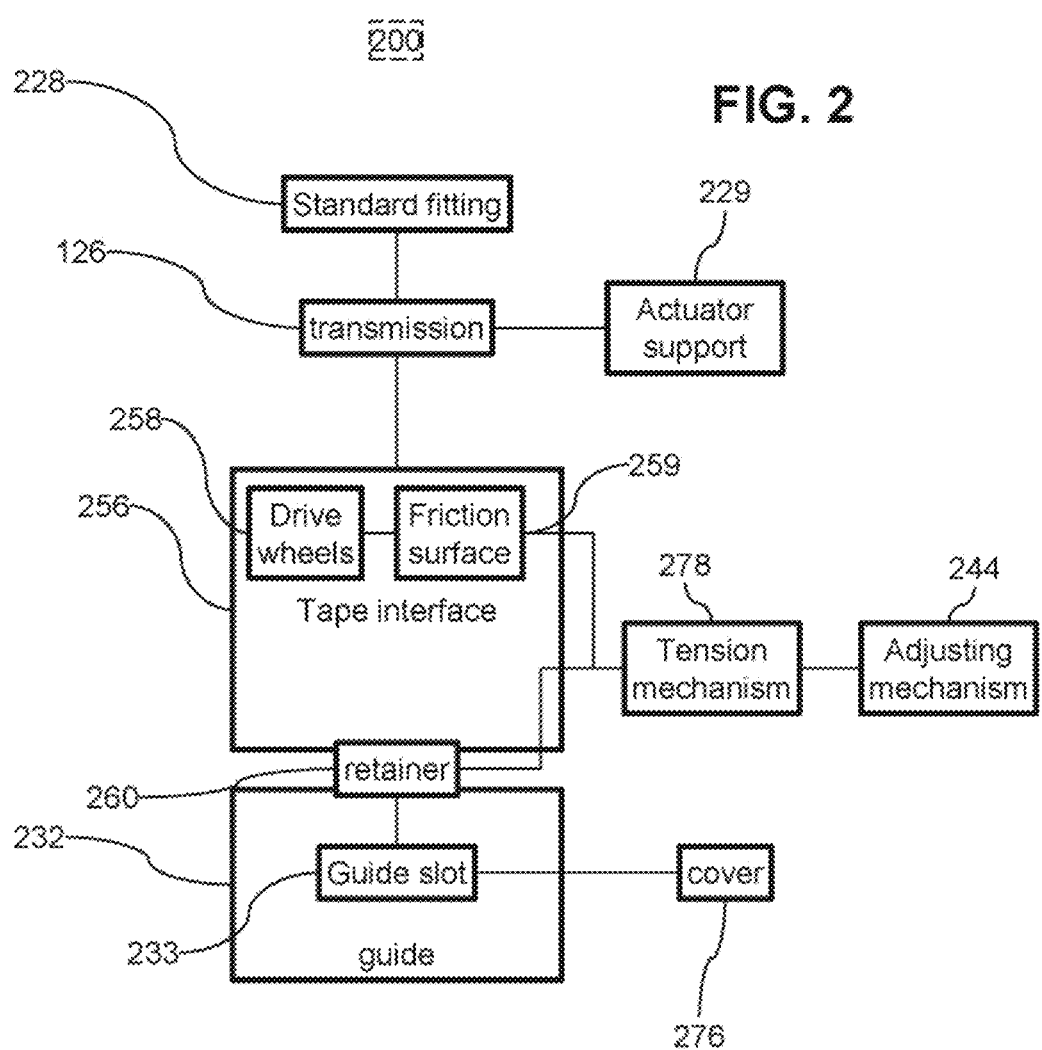
FIG. 2 is a block diagram of a fish tape driver device with further optional components in accordance with an embodiment of the current invention.

FIG. 2 is a block diagram of a fish tape driver device 200 with further optional components in accordance with an embodiment of the current invention. Some embodiments may include some of the components of the system of FIG. 2 and/or omit other components.

In some embodiments, a transmission 126 may include a standard fitting 228 for a power tool. For example, fitting 228 may be configured for reversible connection to a power tool (e.g. for connection to a bit holder of a power screw driver). For example, a standard fitting 228 may include a graspable head (for example a hex head and/or a square head) and/or a socket (for example a hex socket and/or a flat groove and/or a cross head groove) and/or a shank (for example for fitting to a drill chuck). Alternatively additionally, a tape driver device may include an integral actuator. For example, the actuator may be permanently attached to the transmission 126. Optionally a transmission 126 may include a power train. For example, the power train may include a gear and/or a belt and/or a friction wheel and/or a clutch. For example, the power train may give mechanical advantage and/or step up speed of an actuator with respect to the belt interface 256. For example, a clutch may limit the force on the fish tape and/or cause the fish tape to vibrate (e.g. push, stop and/or pull). For example, the clutch may be activated when force on the fish tape passes a threshold and/or the clutch may be activated manually (e.g. by a user activating a switch).

In some embodiments, a transmission may include an actuator support 229. For example, the support 229 may hold a part of an actuator steady with respect to a body of the tape driver device 200 and/or with respect to the fitting 228. Optionally, a driver portion of the actuator moves with respect to the body. For example, combination of connecting a moving driver portion of the actuator to the fitting 228 and a stationary part of the actuator to the actuator support 229 may hold the actuator to the tape driver device 200 without the user needing to hold the actuator and the driver device 200 separately.

In some embodiments, a tape interface 256 may include one or more drive wheels 258. Optionally the drive wheels 258 may include a friction surface 259 for driving the tape. For example, a friction wheel 258 may include a high friction surface 259 and/or a flexible surface 259. For example, the surface 259 of the friction wheel 258 may be covered with rubber (for example vulcanized rubber and/or natural rubber) and/or plastic and/or silicone and/or another elastomer. Optionally the covering may be adhered to the wheel and/or elastically fit to the wheel. Optionally, the wheel 258 and/or the surface 259 may be textured for example with a tread and/or protrusions and/or teeth. Texturing is optional flexible. Alternatively or additionally, texturing may rigid and/or may cause elastic and/or inelastic deformation of the tape (e.g. dig into the tape). Optionally, the drive wheel 258 may be included in a guide 232 of the tape. For example, the drive wheel 258 may include a flange In some embodiments, a tape driver device 200 may include a retainer 260. For example, the retainer 260 may include one or more retaining wheels. Optionally, retainer 260 may hold the tape against a driver wheel 258. Optionally, the retainer 260 and/or retaining wheel may have a smooth surface for compressing the tape against the drive wheel 258. Alternatively or additionally, the retainer 260 may be included in a guide 232 of the tape. For example, a retaining wheel may include a flange.

In some embodiments, tension mechanism 278 and/or an adjustment mechanism 244 holds the tape to the drive wheel 258. For example, the tension mechanism 278 may compress the tape between retainer 260 and the drive wheel 258. Optionally the adjusting mechanism 244 may adjust a relationship between the retainer 260 and/or guide 232 and the tape interface 256 and/or drive wheel 258. For example, the relationship may be adjusted to fit different sizes of fish tape.

In some embodiments, a guide 232 may include a cover 276. For example, the cover 276 may be removed in order to connect the driver device 200 to a fish tape and/or to disconnected the driver device 200 from the fish tape (e.g. by inserting the fish tape into a slot 233 in the driver device 200). Alternatively or additionally, a tape may be connected to the driver device without disassembling the driver device 200. For example, a tip of the tape may be inserted through a hole into the driver device 200 and/or self threaded through the driver device 200 and/or out a second hole.

Figure 3:
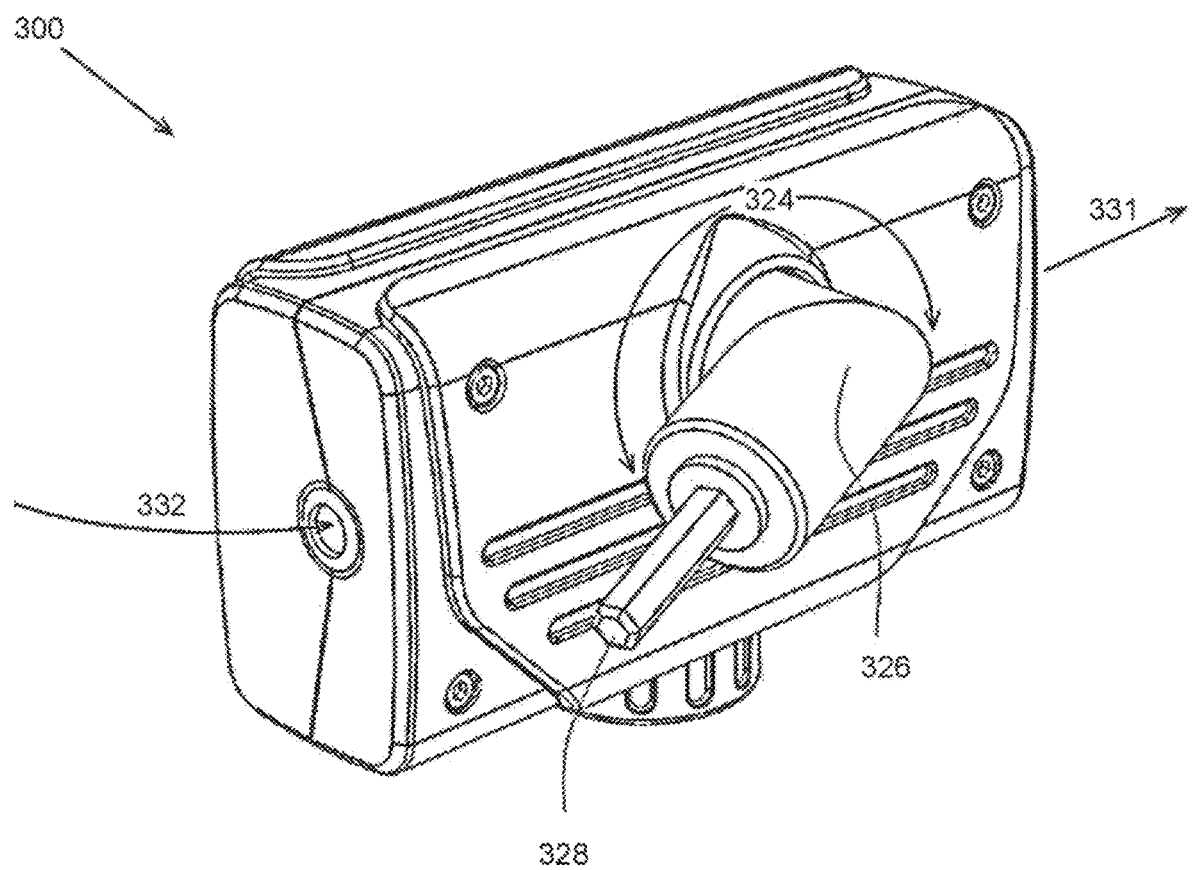
FIG. 3 is a perspective view of a fish tape driver device in accordance with an embodiment of the current invention.

FIG. 3 is a perspective view of a fish tape driver device 300 in accordance with an embodiment of the current invention. In some embodiments, a fish tape driver device 300 transmits power to push and/or pull a fish tape. Optionally the power to the driver device 300 is supplied by a power screwdriver. For example, driver device 300 includes a proximal inlet opening 332 and a distal outlet opening 331. For example, a front end of a fish tape is inserted through the inlet opening 332 and passes through a conduit in the device 300 out outlet opening 331.

In some embodiments, the fish tape driving device 300 includes a standard fitting (for example a hexagonal shaft) for connecting to a power screw driver. Optionally the screw driver supplies power to the fish tape driver device 300 by rotating A standard hexagonal shaft screw driver fitting 328 with respect to a transmission 326 of the device 300. In some embodiments, the transmission can be repositioned (for example by rotating 324 around a joint) for convenient gripping of the device 300 while attached to the power screwdriver.

Figure 4:
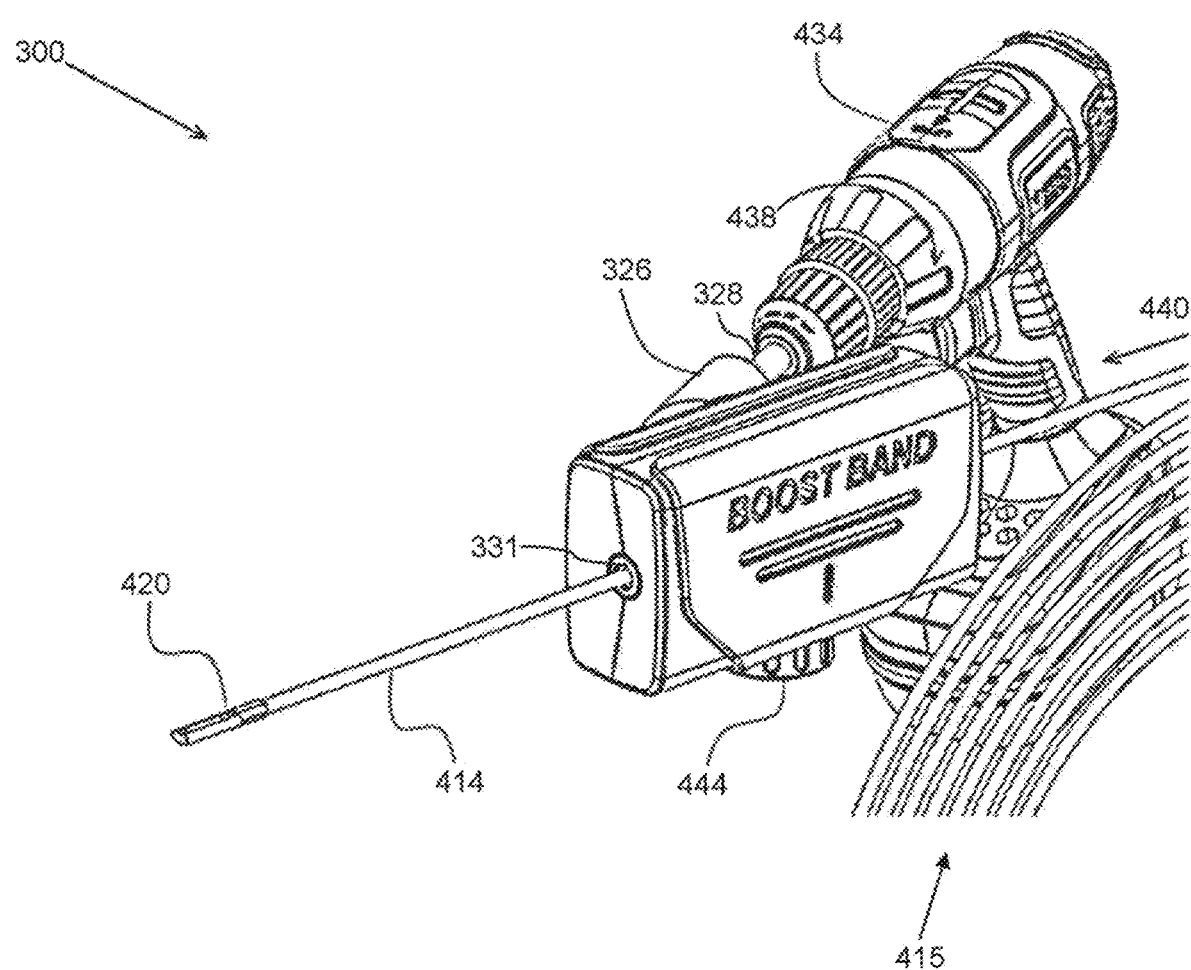
FIG. 4 is a perspective view of a fish tape driver device, a fish tape and an actuator in accordance with an embodiment of the current invention.

FIG. 4 is a perspective view of a fish tape driver device 300, a fish tape 414 and an actuator in accordance with an embodiment of the current invention. In some embodiments, driver device 300 may drive a standard fish tape 414. For example, a tape 414 may be supplied as a long coil 415. A leading tip 420 of the coil 415 is optionally loaded into driver device 300 by inserting 440 the tip 420 through proximal opening 332 and/or across a tape interface (for example interface 546 of FIG. 5) and/or out a distal outlet opening 331. Optionally an adjusting mechanism 444 is supplied for adjusting the tape interface for example to fit different sized tapes. For example, adjusting mechanism 444 may include a knob and/or a screw thread. Optionally, the screw thread connects between the retainer 576 and the drive wheel (e.g. friction wheel 556). For example, friction wheel 556 and adjusting mechanism 444 may be rotatably attached the housing 572a, 572b of the device. For example, twisting adjusting mechanism 444 may move retainer 576 along the threads with respect to the housing 572a, 572b while the position of drive wheels (e.g. friction wheels 556) remain fixed. Alternatively or additionally, twisting adjusting mechanism 444 may move drive wheels (e.g. friction wheels 556) along the threads with respect to the housing 572a, 572b while the position of retainer 576 remains fixed. Alternatively or additionally, a middle portion of fish tape 414 may be inserted into device 300 by removing a bottom cover of the device 300 (e.g. by opening adjuster 444 and/or screws at the bottom of the device) and/or then pushing an edge of the fish tape 414 into a slit in the bottom of the device. Optionally, after the fish tape 414 has been inserted into the device 300, the cover is closed.

In some embodiments, a transmission 326 is configured to be reversibly attached to an actuator. For example, driver fitting 328 is attached to chuck and/or bit holder 438 of power screwdriver 434. For example, rotating the bit holder 438 in a first direction pushes the tip 420 of the tape 414 outward from opening 331. For example, rotating the bit holder 438 in an opposite direction pulls tip 420 back towards outlet opening 331 of device. 300. In some embodiments, an actuator may be connected directly to a drive gear and/or a cog. For example, an axis of a power screwdriver may be attached to the device at 90 degrees to the longitudinal axis of the tape.

Figure 5:
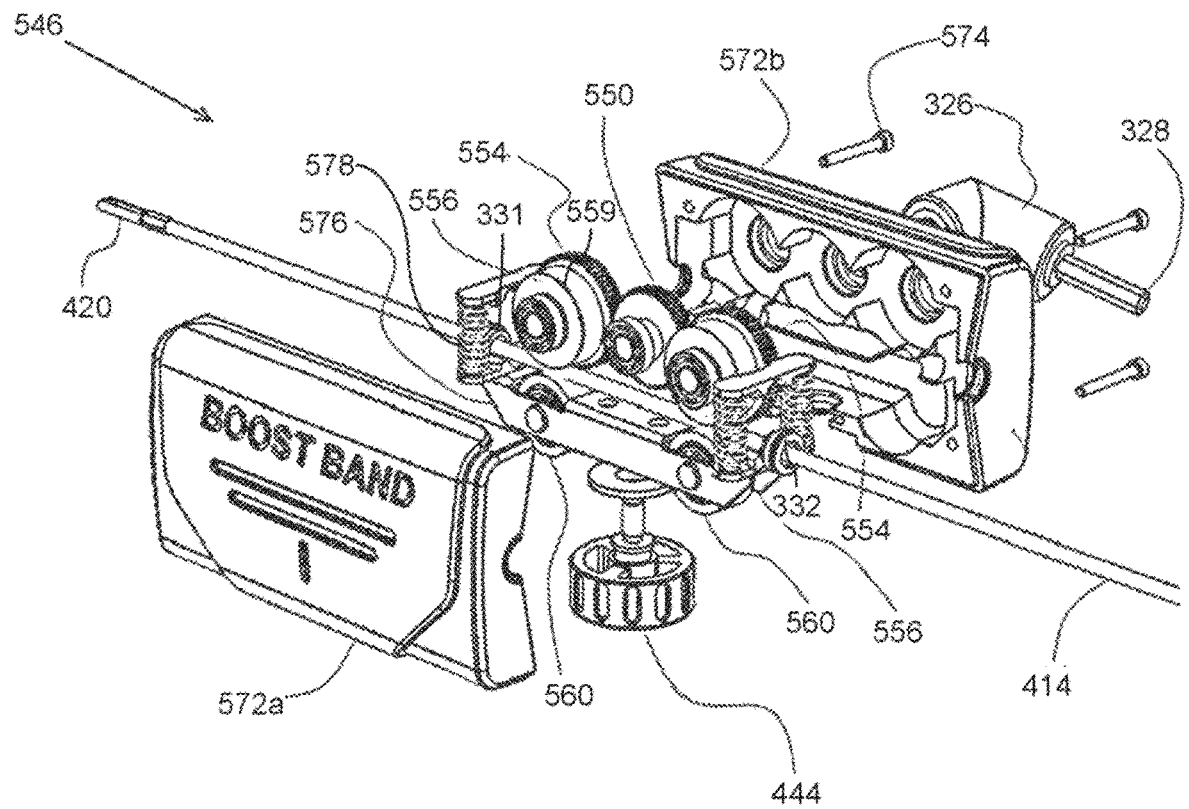
FIG. 5 is an exploded view of a fish tape interface and a fish tape in accordance with an embodiment of the current invention.

FIG. 5 is an exploded view of a driver device 300, fish tape interface 546 and a fish tape 414 in accordance with an embodiment of the current invention. Optionally, tape interface 546 includes a set of friction drive wheels 556. Optionally, a retainer 576 holds a tape 414 against driver wheels 556. For example, tape 414 is sandwiched between retaining wheels 560 and drive wheels 556. Optionally, a tensioning element 578 keeps a prescribed and/or balanced pressure of retainer wheels 560 against drive wheels 556. Optionally, adjuster 444 includes a screw that is configured to tighten retainer 576 towards drive wheels 556 for a thin tape and/or release retainer 576 away from drive wheels 556 for a thick tape.

In some embodiments retaining screws 574 and adjuster 444 may be removed to open device 300 (e.g. by splitting a housing in to two parts 572a and 572b and/or removing a lower cover) for inserting a tape 414 into the device. Alternatively or additionally, the tape 414 may slid through a slit in the side of the device 300. Alternatively or additionally, the tip of the tape may be introduced into opening 332, threaded through interface 546 and/or out outlet opening 331.

In some embodiments, rotation of an adapter rotates a set of transmission gears (e.g. including a central cog 550) which rotate drive cogs 554 and/or drive wheels 556.

Figure 6:
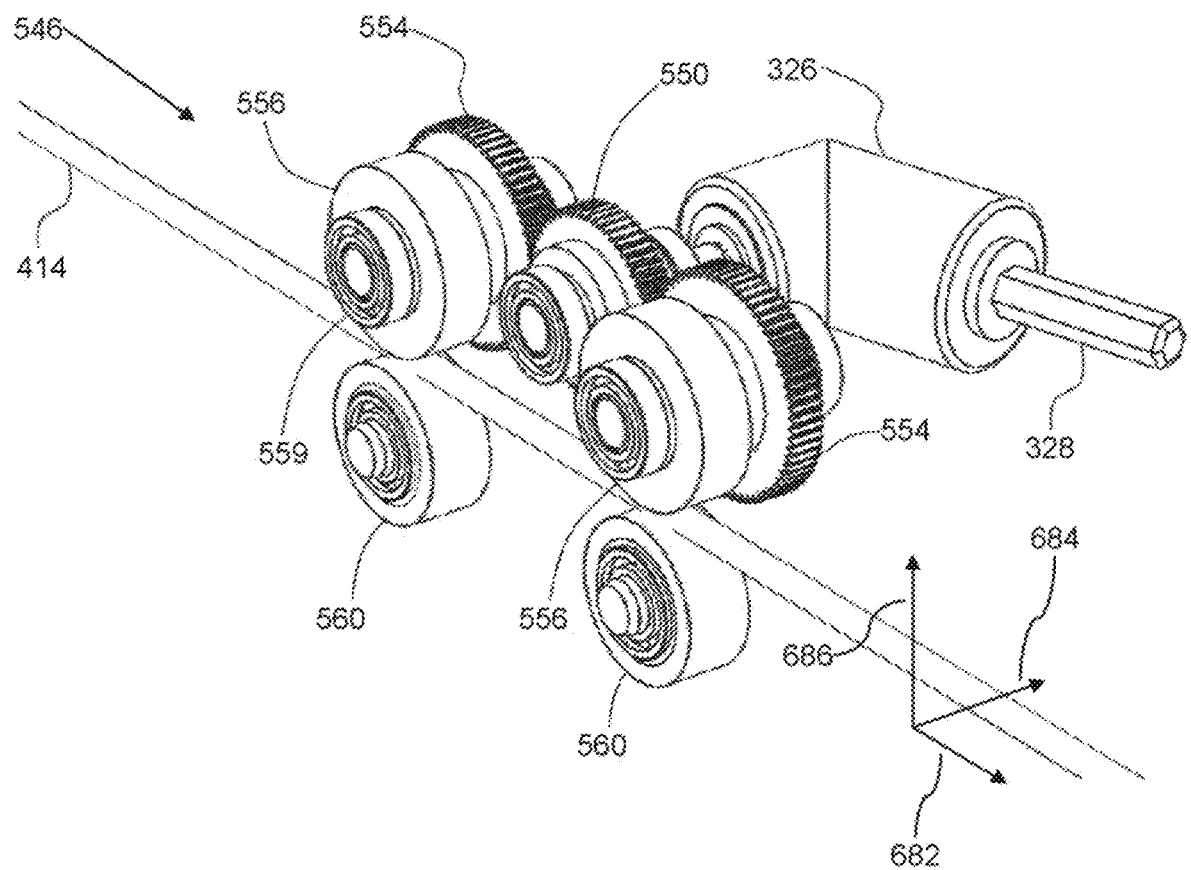
FIG. 6 is a perspective view of a friction drive fish tape interface in accordance with an embodiment of the current invention.

FIG. 6 is a perspective view of a friction drive fish tape interface in accordance with an embodiment of the current invention. Optionally, tape 414 passes straight through interface 546. For example, multiple retaining wheels 560 meet drive wheels 556 along a linear path and/or at the same angle (e.g. the linear path is tangent to the drive wheels 556 and/or retaining wheels 560 at the point of contact). Alternatively or additionally, the intersection of drive wheels 556 and/or retaining wheels 560 is offset such that the tape 414 is force along a curved path through the interface. Tape interface optionally includes multiple pairs of facing drive and retention wheels 556, 560 to drive tape 414. Optionally the wheels are covered with a rubber and/or elastomeric surface 559 that holds the tape by friction. Alternatively or additionally, the interface may include a single wheel and/or a belt and/or more than two pairs of wheels.

In FIG. 6 an exemplary set of axes illustrates directions lateral 684, transverse 686 and longitudinal 682 with respect to the tape 414.

Figure 7:
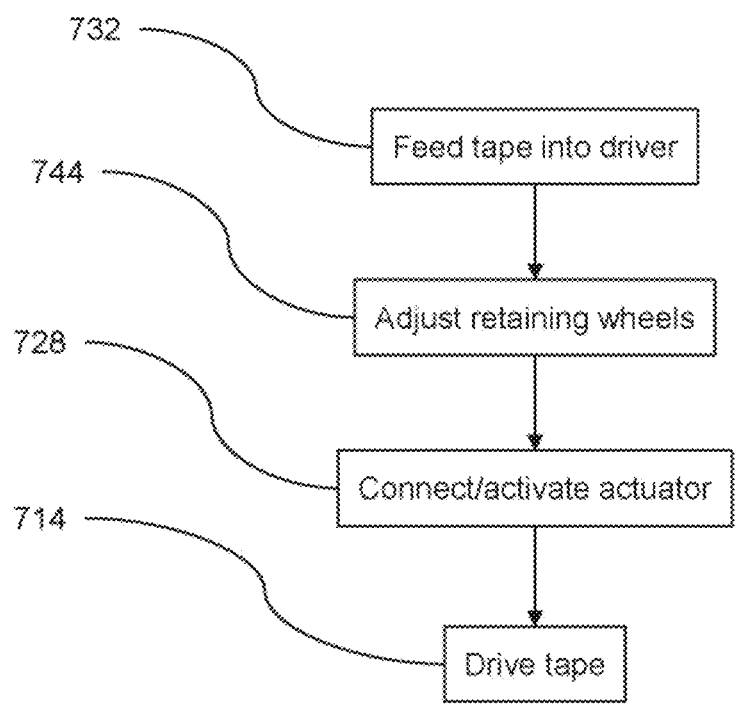
FIG. 7 is a flow chart illustration of driving a fish tape in accordance with an embodiment of the current invention.

FIG. 7 is a flow chart illustration of driving a fish tape in accordance with an embodiment of the current invention. In some embodiments, a tape is fed 732 into the driver device. For example, a tip of tape may be inserted into an entrance opening and/or threaded longitudinally through the device and/or out an exit opening. Alternatively or additionally, a covering of the device may be opened and/or the tape inserted transversely into the interface and/or the covering reclosed. Alternatively or additionally, a covering of the device may be opened and/or the tape inserted laterally into the interface and/or the covering reclosed. Alternatively or additionally, a slit in the device may facilitate inserting the tape laterally into the interface.

In some embodiments, a set of retaining wheels hold the tape against drive wheels. Optionally a tension element may hold compression between the wheels. In some embodiments the distance between the wheels may be adjusted 744 for example for different thickness tapes and/or the wheels may be loosened to allow insertion of the tape and tightened for driving the tape.

In some embodiments an actuator may be connected to the drive wheels and/or activated 728. Optionally activating 728 the actuator drives 714 the tape. In some embodiments, a tape may be inserted into a conduit with the driver device and/or pulled out by the driver device. Alternatively or additionally, the tape may be inserted manually and pulled out with the driver device. Alternatively or additionally, the tape may be inserted using the driver device and/or pulled out manually.

In some embodiments, a tape driver device may include a clutch. For example, if the tape gets stuck and/or will not move the clutch may cut connection and/or release forces between the actuator and the tape (e.g. by cutting connection between the interface and the transmission and/or between the transmission and the actuator and/or between the interface and the tape). Alternatively or additionally, the clutch may cause the tape may be cause to retract and extend to try to get by the obstacle.

Figure 8:
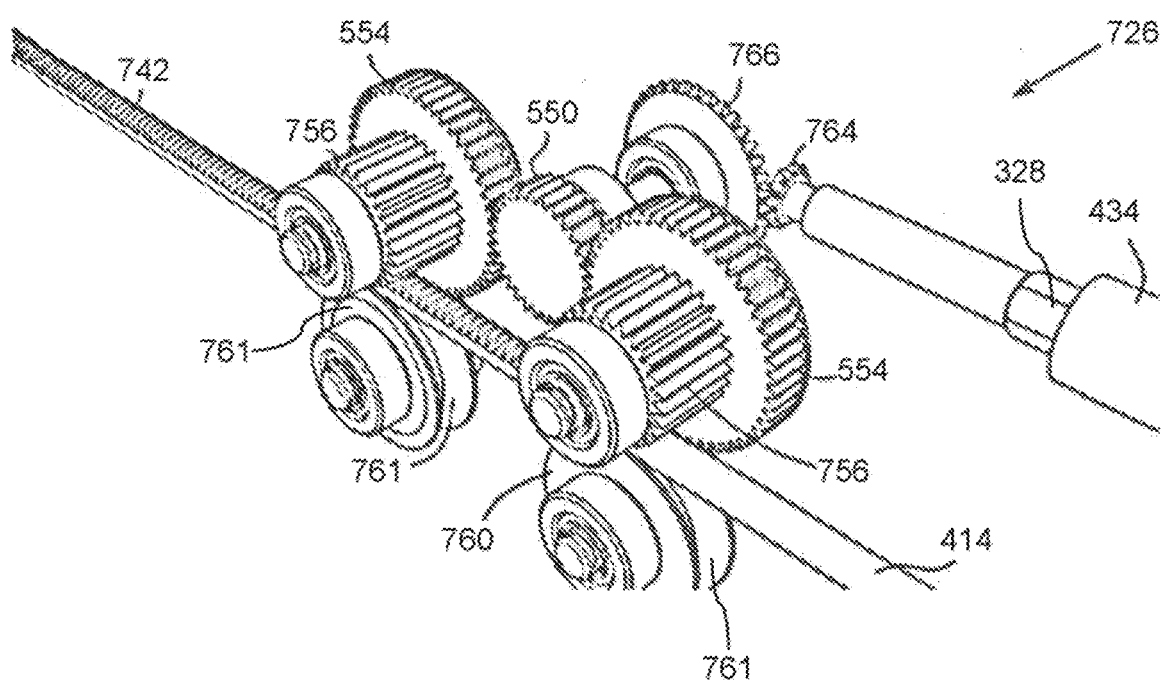
FIG. 8 is a perspective view of a toothed drive fish tape interface in accordance with an embodiment of the current invention.

FIG. 8 is a perspective view of a toothed drive fish tape interface in accordance with an embodiment of the current invention. For example, a drive wheel 756 may include teeth that dig into the tape, for example, the teeth may cause elastic and/or plastic deformation of the tape 414 (e.g. forming grooves 742 temporarily or permanently). In some embodiments, a transmission may include transmission gears 764 and/or 766. Alternatively or additionally an actuator (e.g. a motor and/or a power screw driver) may directly attach to an axle of a driver cog 550 and/or rotate the cog.

In some embodiments a retaining wheel 760 and/or a drive wheel may include one or more flanges 761. For example, flanges may guide the tape. In some embodiments, a flanged retaining wheel may be used with a friction drive wheel.

Figure 9:
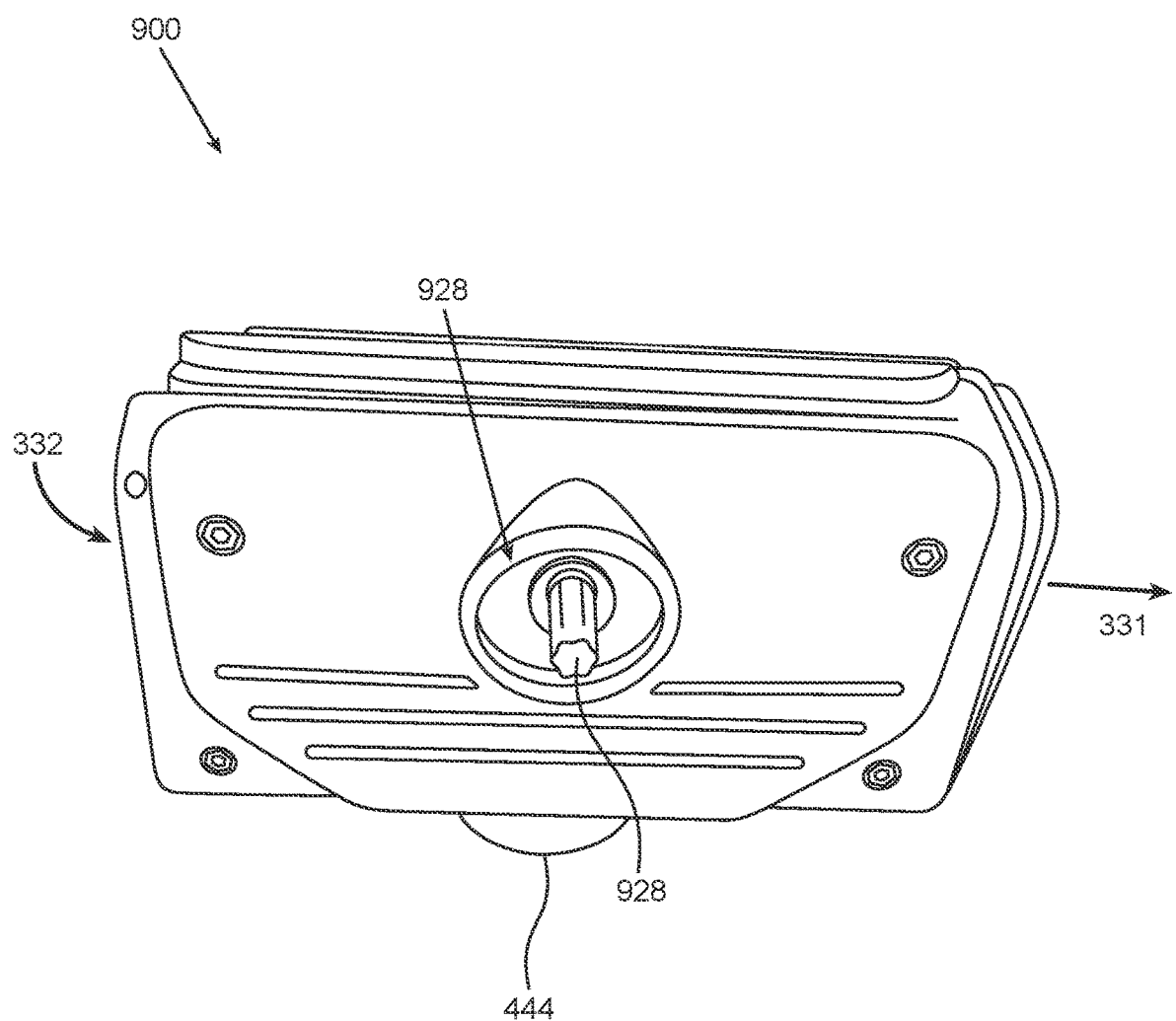
FIG. 9 is a perspective view of a fish tape driver device in accordance with an embodiment of the current invention.

FIG. 9 is a perspective view of a fish tape driver device 900 in accordance with an embodiment of the current invention. In some embodiments, a fish tape driver device 900 transmits power to push and/or pull a fish tape. Optionally the power to the driver device 300 is supplied by a power screwdriver. For example, driver device 900 includes a proximal inlet opening 332 and a distal outlet opening 331. For example, a front end of a fish tape is inserted through the inlet opening 332 and passes through a conduit in the device 900 out outlet opening 331.

In some embodiments, the fish tape driving device 900 includes a standard fitting 928 (for example a hexagonal shaft) for connecting to a power screw driver. Optionally the screw driver supplies power to the fish tape driver device 900 by rotating standard hexagonal shaft screw driver fitting 928 with respect to a transmission 926 of the device 300.

Figure 10:
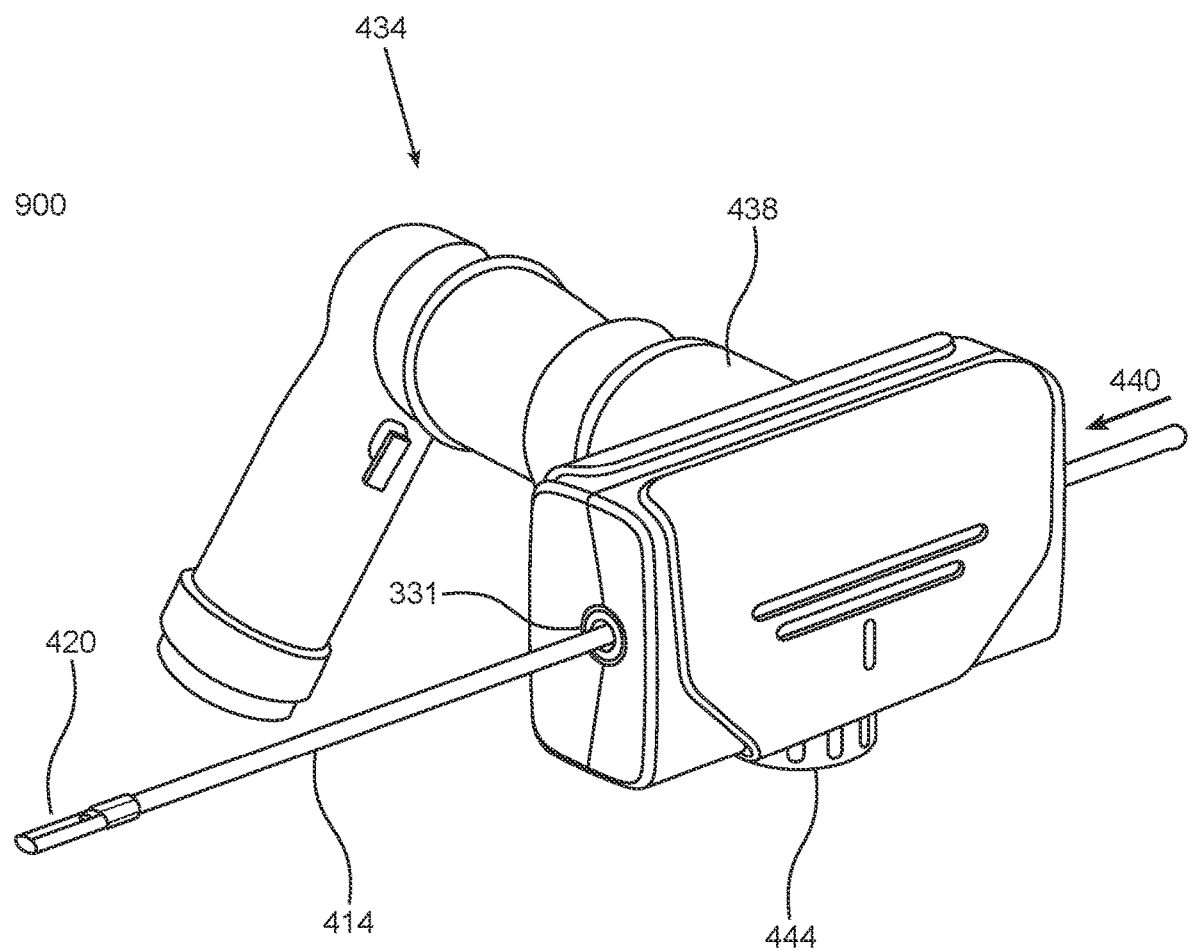
FIG. 10 is a perspective view of a fish tape driver device, a fish tape and an actuator in accordance with an embodiment of the current invention.

FIG. 10 is a perspective view of fish tape driver device 900, a fish tape 414 and an actuator in accordance with an embodiment of the current invention. In some embodiments, driver device 900 may drive a standard fish tape 414. A leading tip 420 of the tape 414 is optionally loaded into driver device 900 by inserting 440 the tip 420 through proximal opening and/or across a tape interface and/or out a distal outlet opening 331. Optionally an adjusting mechanism 444 is supplied for adjusting the tape interface for example to fit different sized tapes. For example, adjusting mechanism 444 may include a knob and/or a screw thread for example as illustrated in embodiments herein above.

In some embodiments, a transmission 926 is configured to be reversibly attached to an actuator. For example, driver fitting 928 is attached to chuck and/or bit holder 438 of power screwdriver 434. For example, rotating the bit holder 438 in a first direction pushes the tip 420 of the tape 414 outward from opening 331. For example, rotating the bit holder 438 in an opposite direction pulls tip 420 back towards outlet opening 331 of device 900. In some embodiments, an actuator 434 may be connected directly to a drive gear and/or a cog. For example, an axis of a power screwdriver may be attached to the device at 90 degrees to the longitudinal axis of the tape.

Figure 11A:
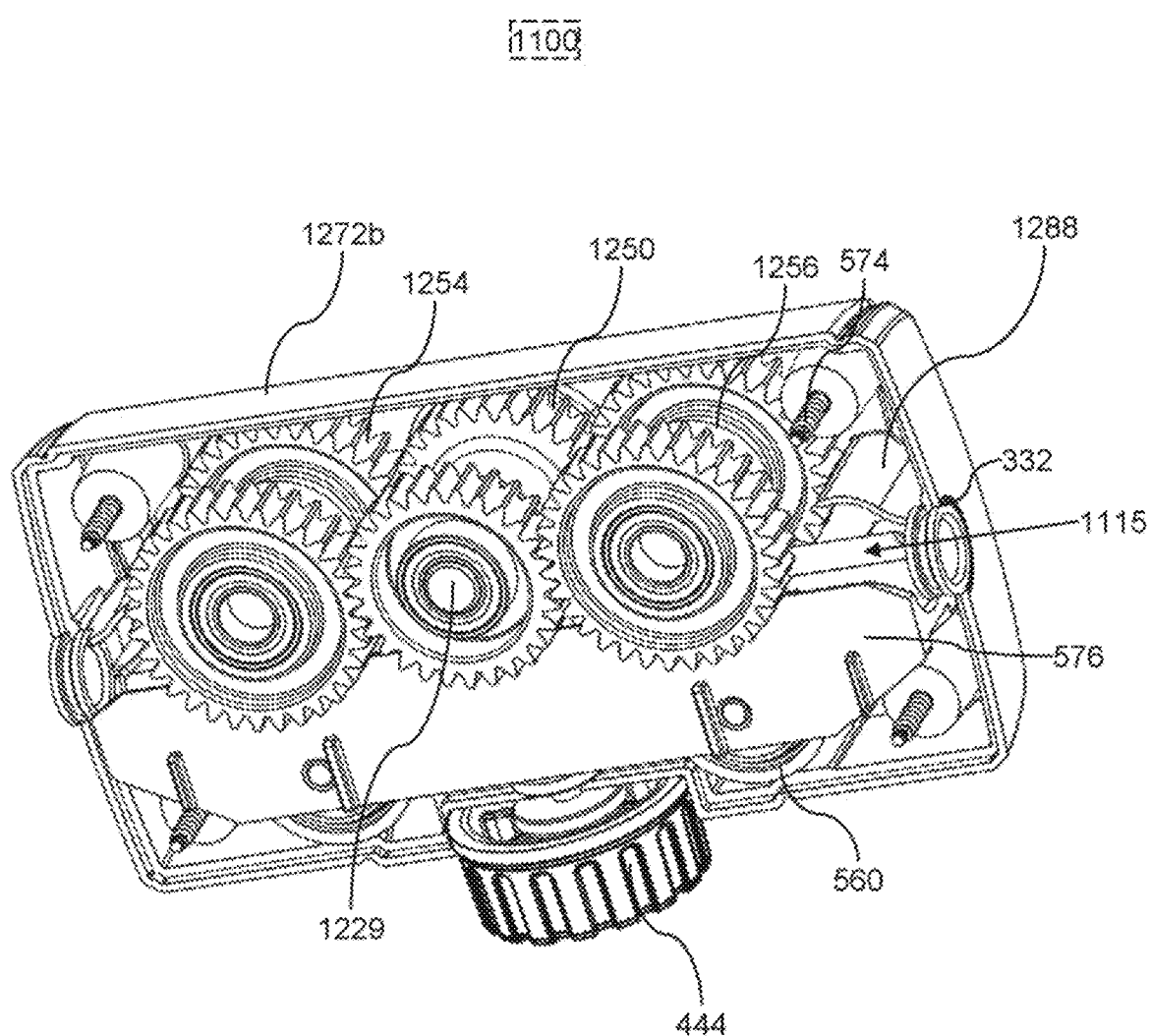
FIG. 11A is a perspective view of an open fish tape driver device in accordance with and embodiment of the current invention.
Figure 11B:
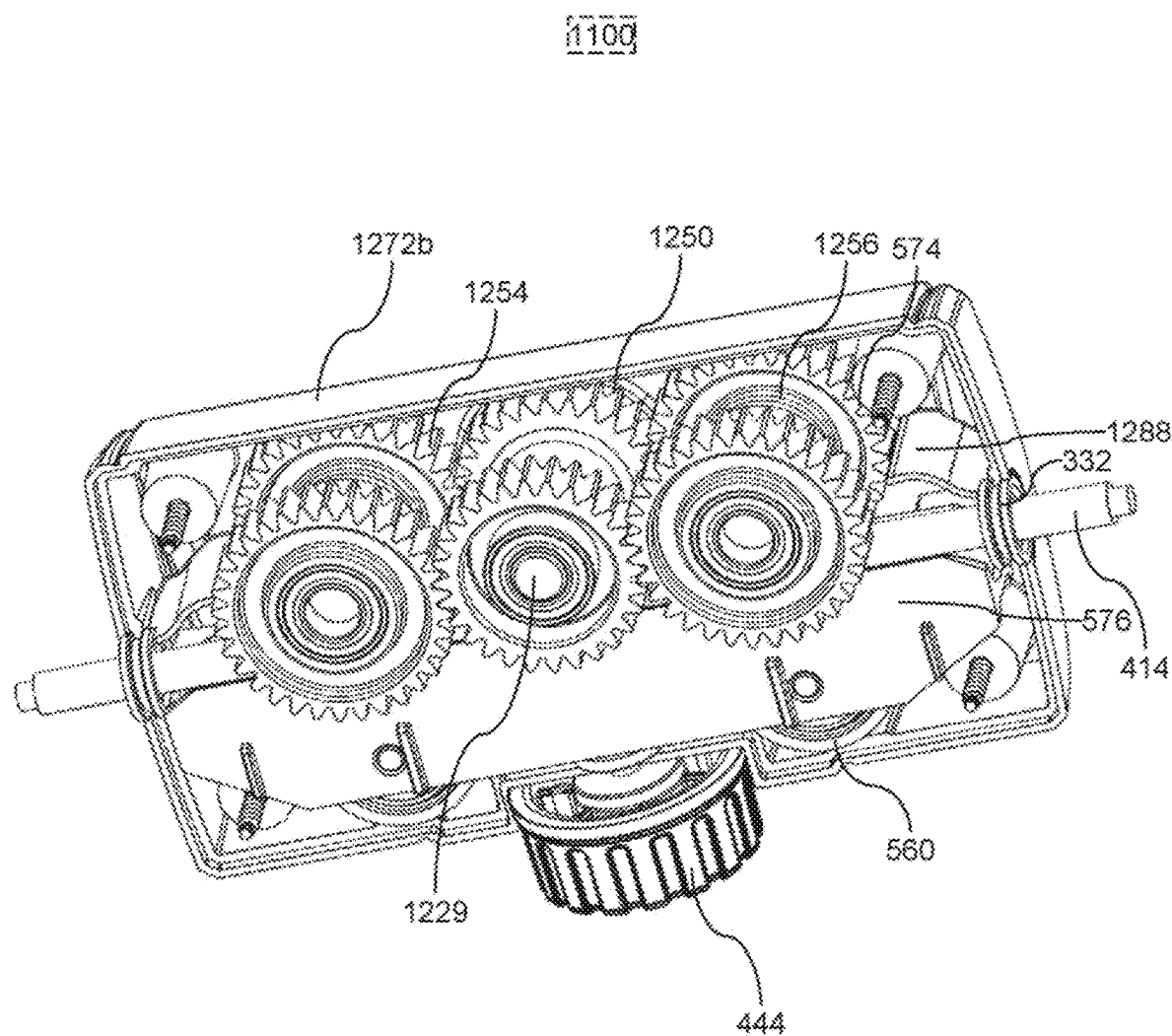
FIG. 11B is a perspective view of an open fish tape driver device and fish tape in accordance with and embodiment of the current invention.
Figure 12:
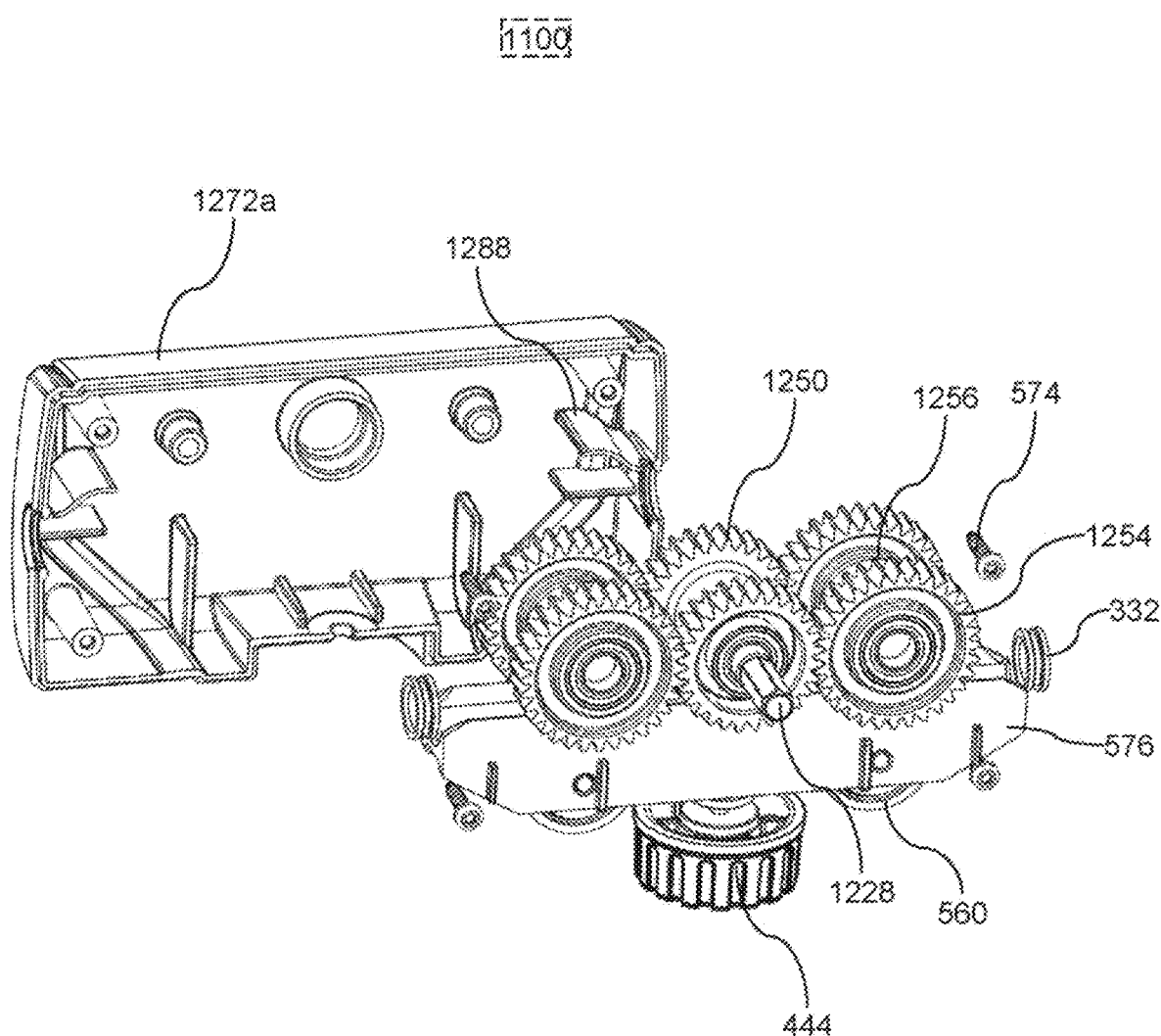
FIG. 12 is a semi exploded perspective view of an open fish tape driver device in accordance with and embodiment of the current invention.

FIG. 11A is a perspective view of an open fish tape driver system 1100 in accordance with and embodiment of the current invention. FIG. 11B is a perspective view of an open fish tape driver system 1100 and tape 414 in accordance with and embodiment of the current invention. In some embodiments, a fish tape driver device 1100 may be designed to drive an external fish tape 414 and/or be powered by an external actuator (for example an electric drill and/or an electric screw driver). Optionally, the driver cog 1250 and/or a drive cog 1254 includes double cogs on opposites sides of the path 1115 of movement of the tape 414. For example, drive cogs 1254 are opposite sides of a friction wheel 1256. For example, driving an axle 1229 with an external device rotates driver cogs 1250. Optionally the twin driver cogs 1250 are positioned on opposite sides of a path 1115 of travel of a fish tape 414 and/or synchronized by a shared axle 1229 (for example axle 1229 as illustrated in FIGS. 12 and/or 13). For example, driver cogs 1250 may mesh on two opposing sides thereof with synchronized sets of drive cogs 1254 that drive friction wheel 1256. Alternatively or additionally, there may be a single drive cog and/or friction wheel meshed to the driver cog and/or a friction wheel may be directly connected to an axle 1229 and/or the axle 1229 may be driven directly by an external actuator. For example, the dual cogs 1250, 1254 may balance forces on the friction wheels 1256 and/or the drive cogs 1254 may act as guides on opposite sides of the fish tape 414.

In some embodiments, tape driver system 1100 may include a guide 1288 that directs the tape from an entrance opening 332 towards a travel path 1115 and/or a friction wheel 1256 between drive cogs 1254. Optionally drive cogs 1254 are mounted concentric to and/or on both sides of the friction wheel 1256. Additionally or alternatively, drive cogs 1254 have a larger radius that friction wheel 1256. For example, the mechanical advantage may range between 10% to 30% and/or from 1 to 10% and/or from 30 to 70% and/or between 70 to 150% and/or 150 to 500%. Optionally, there will be a mechanical advantage from the driver cog 1250 to the drive cog 1254 (e.g. the driver cog 1250 will be rotated by the external rotation source and/or at the same rate as the rotation source and/or will drive a larger drive cog 1254). For example, the total mechanical advantage from the rotation source to the friction wheels may range between 20 to 40% and/or between 0 to 20% and/or 40 to 100% and/or 100 to 200%.

FIG. 12 is a semi exploded perspective view of an open fish tape driver device 1100 in accordance with and embodiment of the current invention. The drive system (including a transmission of cogs 1250 and 1254 driven by an axle 1229 having a fitting 1228 for a standard drill chuck and/or screwdriver chuck and/or a retainer 576) are held together and/or sandwiched between two sides 1272*a*, 1272*b* of an outer shell. Optionally, guide 1288 is built into one or both sides 1272*a*, 1272*b* of an outer shell.

Figure 13:
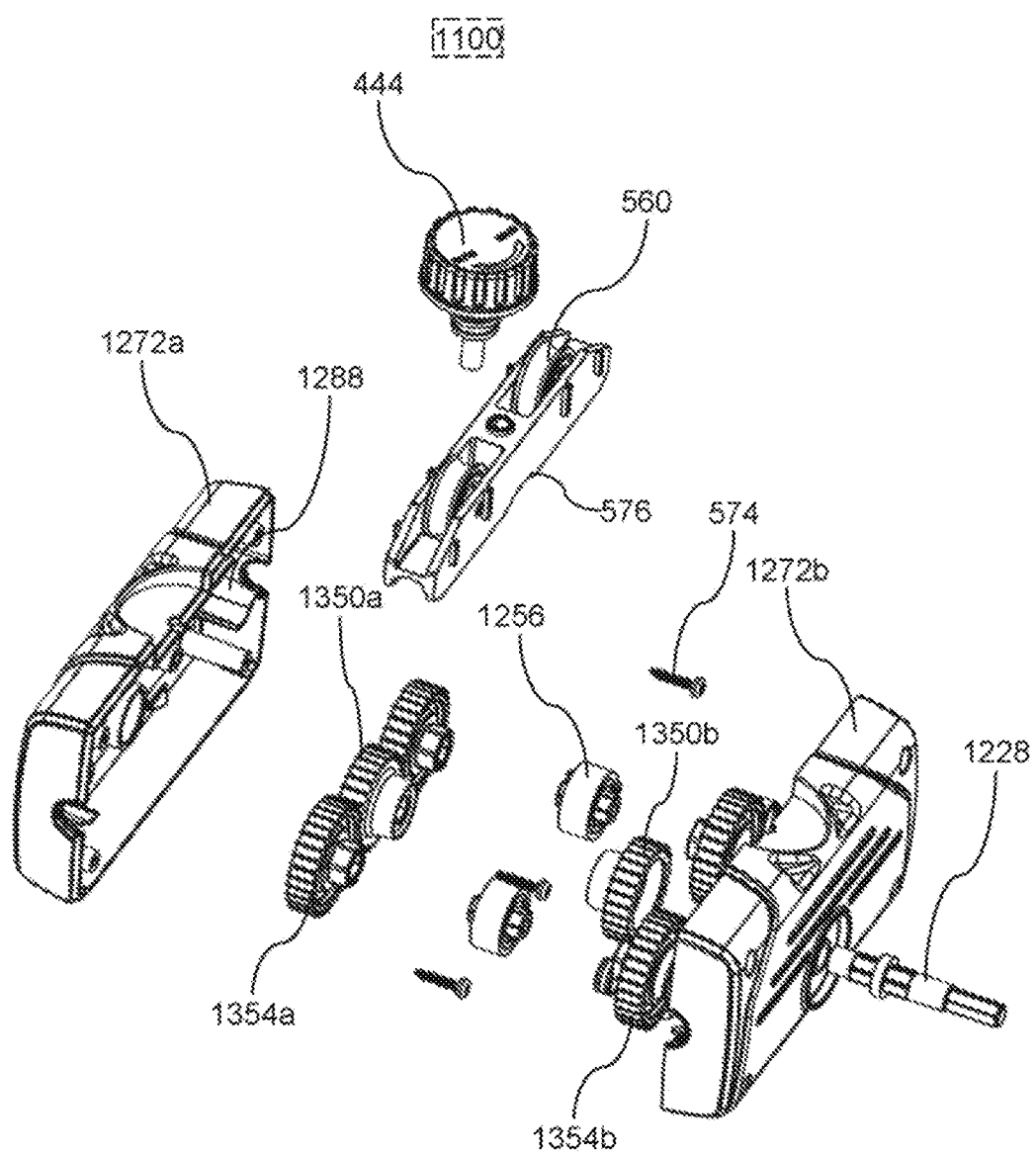
FIG. 13 is a semi exploded perspective view of drive parts of an open fish tape driver device in accordance with and embodiment of the current invention.

FIG. 13 is a semi exploded perspective view of drive parts of an open fish tape driver device in accordance with and embodiment of the current invention. In some embodiments one or more of the pairs of driver cogs 1350*a*, 1350*b* and/or drive cogs 1354*a*, 1354*b* are made as a pair of gears that fit and/or lock together to form an interconnected pair of concentric gears that rotate together. Optionally, a friction wheel 1256 fits and/or locks and/or rotates together with and/or between the drive gears 1254*a,* 1254*b.* Optionally, the fitting 1228 to the drive source/actuator is made in one piece with an axle 1229 that fits into, locks to and/or rotates with the driver gears 1350*a,* 1350*b.* Optionally, retaining wheels 560 may be made of a low friction material (e.g. smooth and/or molded nylon). Alternatively or additionally, retaining wheels 560 may include a high friction coating (e.g. rubber and/or elastomer). Optionally, friction wheels 1256 may be made of a single molded part material (e.g. of high friction material and/or low friction material). Alternatively or additionally, friction wheels 1256 may include a high friction coating (e.g. rubber and/or elastomer). Optionally, some or all of cogs 1250 and/or 1254 are made of molded polymer (e.g. plastic and/or nylon and/or elastomer). Optionally, fitting 1228 is made of metal (e.g. steel).

It is expected that during the life of a patent maturing from this application many relevant technologies will be developed and the scope of the terms is intended to include all such new technologies a priori.

As used herein the term "about" refers to ±10%

The terms "comprises", "comprising", "includes", "including", "having" and their conjugates mean "including but not limited to".

The term "consisting of" means "including and limited to".

The term "consisting essentially of" means that the composition, method or structure may include additional ingredients, steps and/or parts, but only if the additional ingredients, steps and/or parts do not materially alter the basic and novel characteristics of the claimed composition, method or structure.

As used herein, the singular form "a", "an" and "the" include plural references unless the context clearly dictates otherwise. For example, the term "a compound" or "at least one compound" may include a plurality of compounds, including mixtures thereof.

Throughout this application, various embodiments of this invention may be presented in a range format. It should be understood that the description in range format is merely for convenience and brevity and should not be construed as an inflexible limitation on the scope of the invention. Accordingly, the description of a range should be considered to have specifically disclosed all the possible subranges as well as individual numerical values within that range. For example, description of a range such as from 1 to 6 should be considered to have specifically disclosed subranges such as from 1 to 3, from 1 to 4, from 1 to 5, from 2 to 4, from 2 to 6, from 3 to 6 etc., as well as individual numbers within that range, for example, 1, 2, 3, 4, 5, and 6. This applies regardless of the breadth of the range.

Whenever a numerical range is indicated herein, it is meant to include any cited numeral (fractional or integral) within the indicated range. The phrases "ranging/ranges between" a first indicate number and a second indicate number and "ranging/ranges from" a first indicate number "to" a second indicate number are used herein interchangeably and are meant to include the first and second indicated numbers and all the fractional and integral numerals therebetween.

It is appreciated that certain features of the invention, which are, for clarity, described in the context of separate embodiments, may also be provided in combination in a single embodiment. Conversely, various features of the invention, which are, for brevity, described in the context of a single embodiment, may also be provided separately or in any suitable subcombination or as suitable in any other described embodiment of the invention. Certain features described in the context of various embodiments are not to be considered essential features of those embodiments, unless the embodiment is inoperative without those elements.

What is claimed is:

1. A method of inserting a fish tape into a conduit comprising:
   loading the fish tape into a driver device;
   inserting the fish tape between a friction wheel and a movable retainer positioned inside said driver device;
   tightening said movable retainer to press said fish tape against said friction wheel;
   adjusting a distance between the movable retainer and the friction wheel with an adjuster, wherein said adjuster includes a screw thread connecting between said movable retainer and said friction wheel and wherein twisting said screw thread in a first direction moves said retainer towards said friction wheel and wherein twisting said screw thread in an opposite direction distances said retainer from said friction wheel;
   retaining an exit opening of the driver device proximal to an opening of the conduit; and
   activating the driver device to drive a portion of the fish tape through the driver device, out the exit opening of the driver device and into the conduit.

2. The method of claim 1, wherein said inserting includes feeding a distal end of the fish tape longitudinally between said friction wheel and said retainer.

3. The method of claim 2, wherein said inserting is through a proximal opening of said driver device.

4. The method of claim 2, wherein said inserting includes sliding said fish tape laterally into a space between said friction wheel and said retainer.

5. The method of claim 2, where said inserting includes opening a cover of said driver device, positioning said fish tape and replacing said cover.

6. The method of claim 5, further comprising loosening said retainer before said positioning the fish tape and tightening the retainer after said positioning.

7. The method of claim 1, wherein said activating includes actuating an electric actuator.

8. The method of claim 7, further comprising reversibly attaching said electric actuator to the driver device.

9. A method of drawing a fish tape out of a conduit comprising:
   supplying the fish tape having a distal portion inserted into the conduit and a proximal portion extending out of an opening of the conduit;
   retaining an exit opening of a driver device proximal to the opening of the conduit;
   activating the driver device for pulling said distal portion of the fish tape through the opening of the conduit into the exit opening of the driver device, wherein said pulling the fish tape into the driver device includes driving the fish tape between a friction wheel and a movable retainer positioned inside the driver device; and
   adjusting a distance between the movable retainer and the friction wheel with an adjuster, wherein said adjuster includes a screw thread connecting between said movable retainer and said friction wheel and wherein twisting said screw thread in a first direction moves said retainer towards said friction wheel and wherein twisting said screw thread in an opposite direction distances said retainer from said friction wheel.

10. The method of claim 9, further comprising driving said distal portion out of an entrance opening of said driver device.

11. The method of claim 9, wherein said activating includes actuating an electric actuator.

12. The method of claim 9, further comprising reversibly attaching an actuator to the driver device and wherein said activating the driver device includes activating the actuator.

13. A driver device for a fish tape comprising:
- a tape interface comprising a friction wheel and configured for transforming kinetic energy into a longitudinal movement of the fish tape with respect to the driver device;
- a transmission configured for transmitting kinetic energy from an actuator to the tape interface, wherein said transmission includes a standard fitting concentric to an axle of a drive cog and is configured for reversible attachment to said actuator, wherein said drive cog includes a pair of cogs, and wherein said pair of cogs are positioned on opposite sides of a movement path of the fish tape; and
- a movable retainer positioned inside the driver device configured to press the fish tape against said friction wheel.

14. The driver device of claim 13, further comprising a guide configured for directing said longitudinal movement of the fish tape into movement into or out of a conduit.

15. The driver device of claim 14, wherein said guide includes an exit opening of the driver device.

16. The driver device of claim 13, wherein the friction wheel is sandwiched between two cogs.

17. The driver device of claim 16, wherein a radius of the friction wheel less than a radius of each of said two cogs.

18. The driver device of claim 13, where said friction wheel includes a covering of at least one material including natural rubber, vulcanized rubber, plastic, and silicone.

19. The driver device of claim 13, further comprising a tension element configured to apply a compressing force on said fish tape between said movable retainer and said friction wheel.

20. The driver device of claim 19, wherein said tension element includes an elastic element.

21. The driver device of claim 13, wherein said standard fitting is configured for attachment to a power screwdriver.

22. The driver device of claim 13, wherein said standard fitting includes at least one of a graspable head, a socket and a shank.

23. The driver device of claim 13, wherein said standard fitting includes at least one of a hex head, a rectangular head, a hex socket, a rectangular socket, round shank, a hexagonal shank and a rectangular shank.

\* \* \* \* \*